Dec. 7, 1971     D. C. HANNA     3,624,852

MODULE CAR WASH

Original Filed June 1, 1967     6 Sheets-Sheet 1

DANIEL C. HANNA
INVENTOR

BY BUCKHORN, BLORE, KLARQUIST & SPARKMAN
ATTORNEYS

Dec. 7, 1971   D. C. HANNA   3,624,852
MODULE CAR WASH
Original Filed June 1, 1967   6 Sheets-Sheet 2

DANIEL C. HANNA
INVENTOR
BY
BUCKHORN, BLORE, KLARQUIST & SPARKMAN
ATTORNEYS

Dec. 7, 1971  D. C. HANNA  3,624,852
MODULE CAR WASH

Original Filed June 1, 1967  6 Sheets-Sheet 6

DANIEL C. HANNA
INVENTOR

BY
BUCKHORN, BLORE, KLARQUIST & SPARKMAN
ATTORNEYS

United States Patent Office 3,624,852
Patented Dec. 7, 1971

1

3,624,852
MODULE CAR WASH
Daniel C. Hanna, 16325 SE. Cherry Court,
Milwaukie, Oreg. 97222
Continuation of application Ser. No. 826,067, May 12,
1969, which is a continuation of application Ser. No.
642,935, June 1, 1967. This application June 15, 1970,
Ser. No. 48,876
Int. Cl. B60s 3/06
U.S. Cl. 15—21 D
21 Claims

ABSTRACT OF THE DISCLOSURE

A plurality of separate, arched frames carry siding sections on the sides thereof and carry car brushing, spraying and drying mechanisms to form modules which can be shipped separately. The frames can be assembled in side-by-side arrangement to form both the sidewalls and framing of a building as well as the support of the car brushing, spraying and drying mechanisms. Roof sections placed on the assembled frames complete the building. This construction permits assembly of a complete car wash including the building and all the car washing equipment in less than eight hours, and enables the building to be very compact.

---

This is a continuation of application Ser. No. 826,067, filed May 12, 1969, and now abandoned, which is a continuation of application Ser. No. 642,935, filed June 1, 1967, and now abandoned.

This invention relates to a module car wash, and more particularly to a car wash formed of a plurality of frames which serve as both framing of a building and as the support for the several car washing mechanisms of an automatic car wash.

An object of the invention is to provide a module car wash.

Another object of the invention is to provide a car wash formed of a plurality of frames which serve as both framing of a building and as the support for the several car washing mechanisms of an automatic car wash.

A further object of the invention is to provide a car wash module including an arched frame carrying siding material on its exterior and carrying a car washing mechanism on its interior.

Another object of the invention is to provide a car wash including a plurality of arched frames secured in side-by-side positions and carrying a roof on their tops, siding on their sides and car washing mechanisms interiorly thereof.

The invention provides a module car wash including a plurality of arched frames carrying a car washing mechanism interiorly and siding sections exteriorly to define modules. The modules preferably are transportable separately and can be secured in side-by-side relationship to form both the sidewalls and framing of the building of a car wash and also mount the car washing mechanisms in operable positions to form a complete, automatic car wash when connected to water and electricity. Roof sections are fitted onto the tops of the frames to complete the building.

Figure 1:
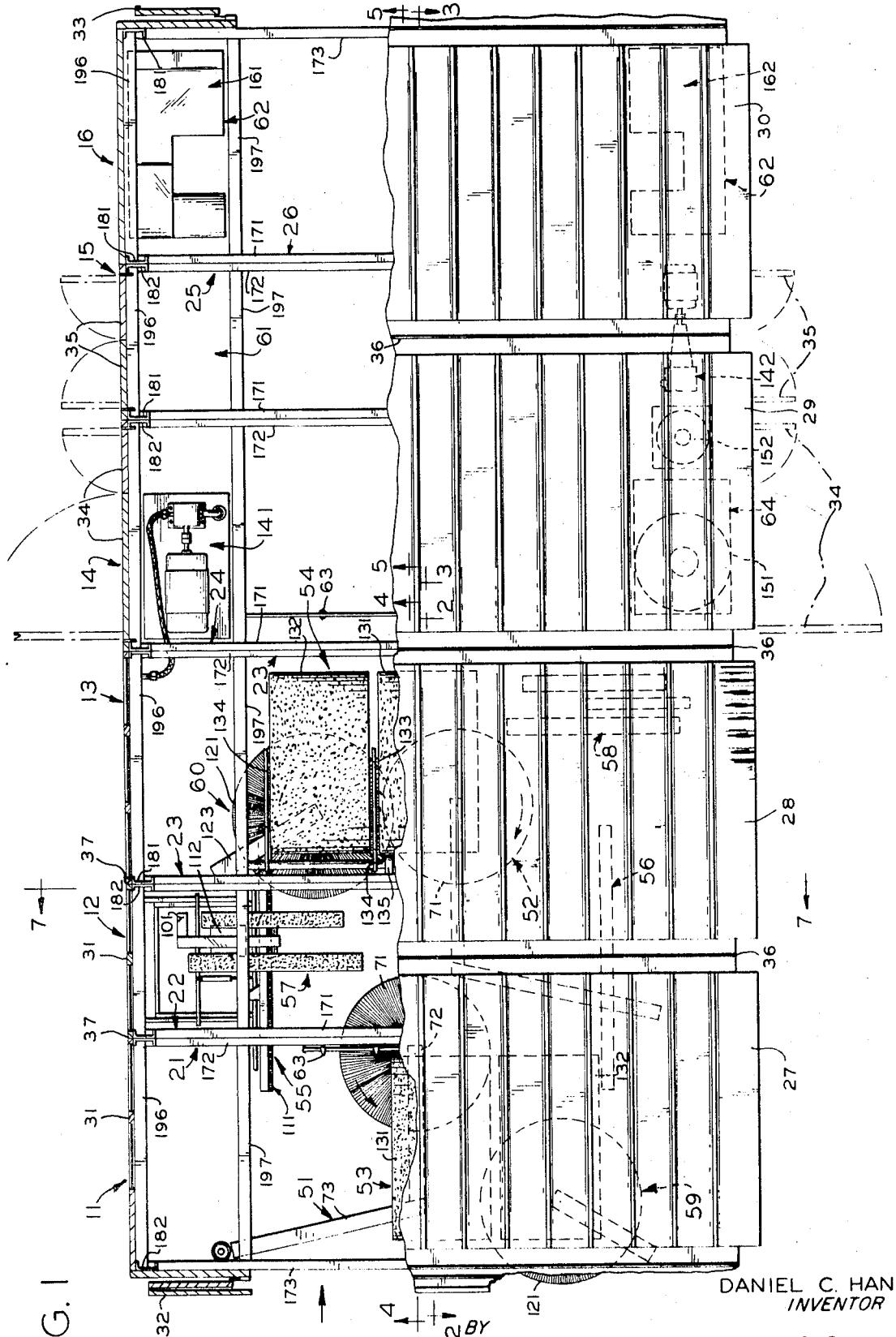
Figure 2:
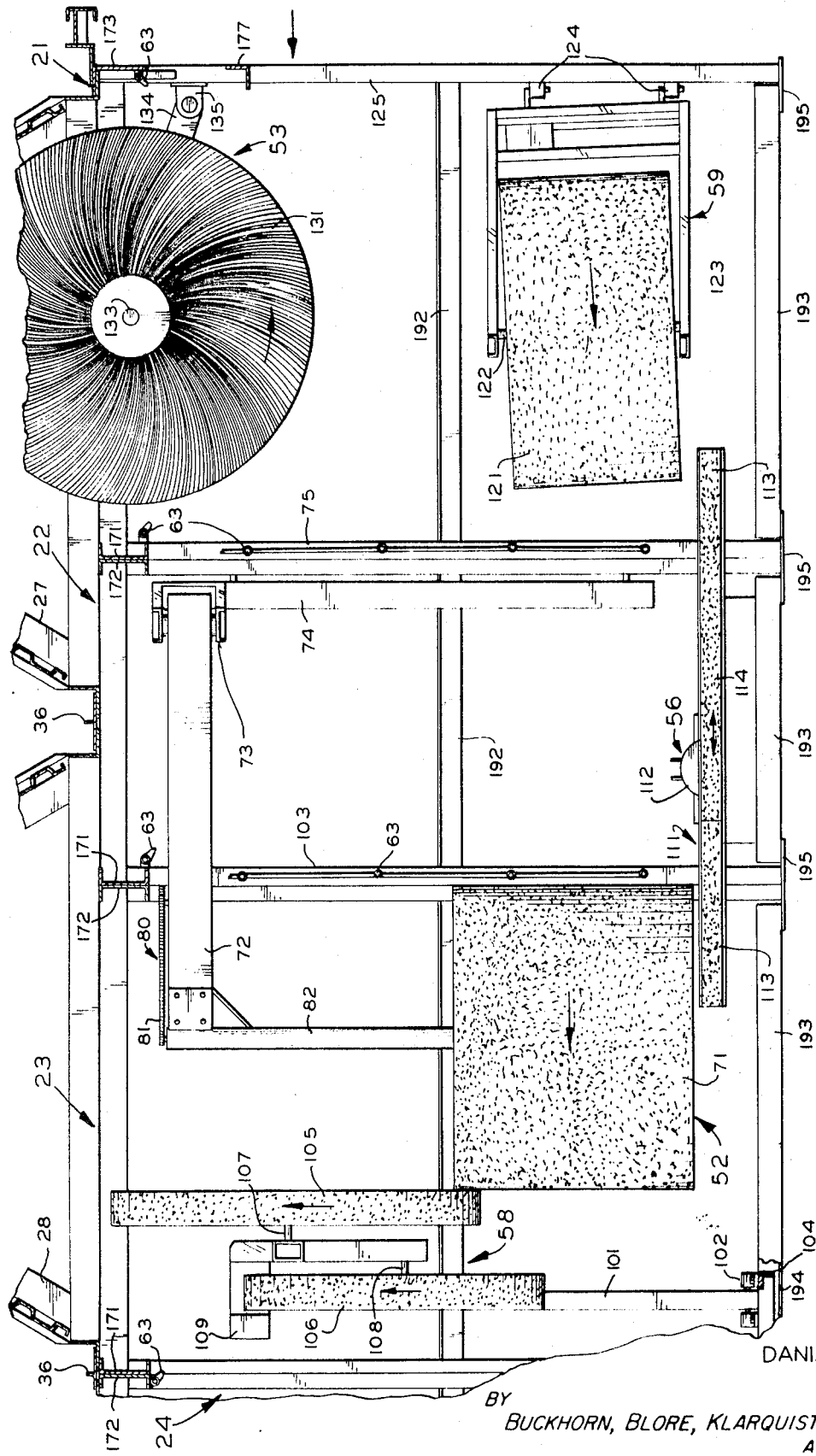
Figure 3:
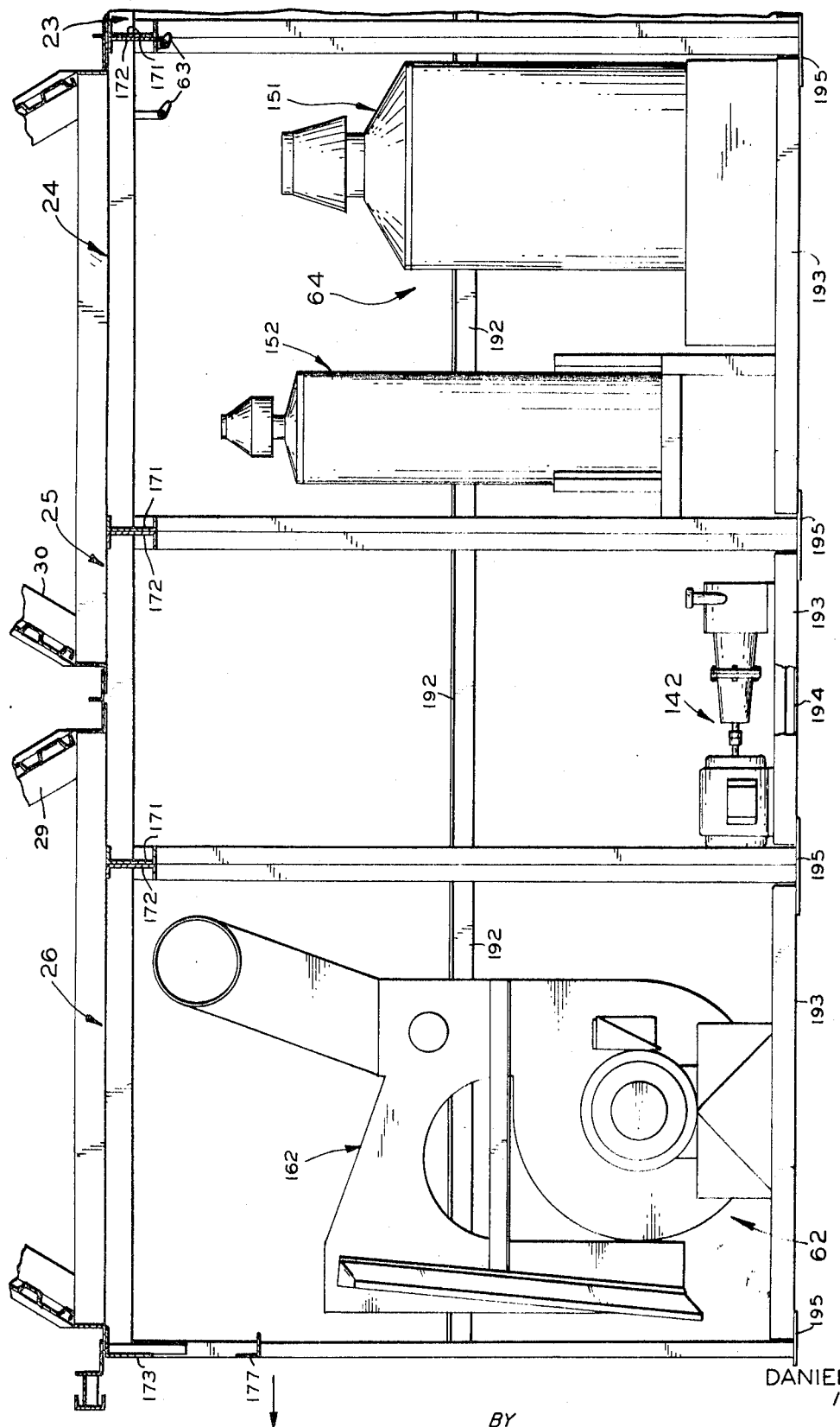
Figure 4:
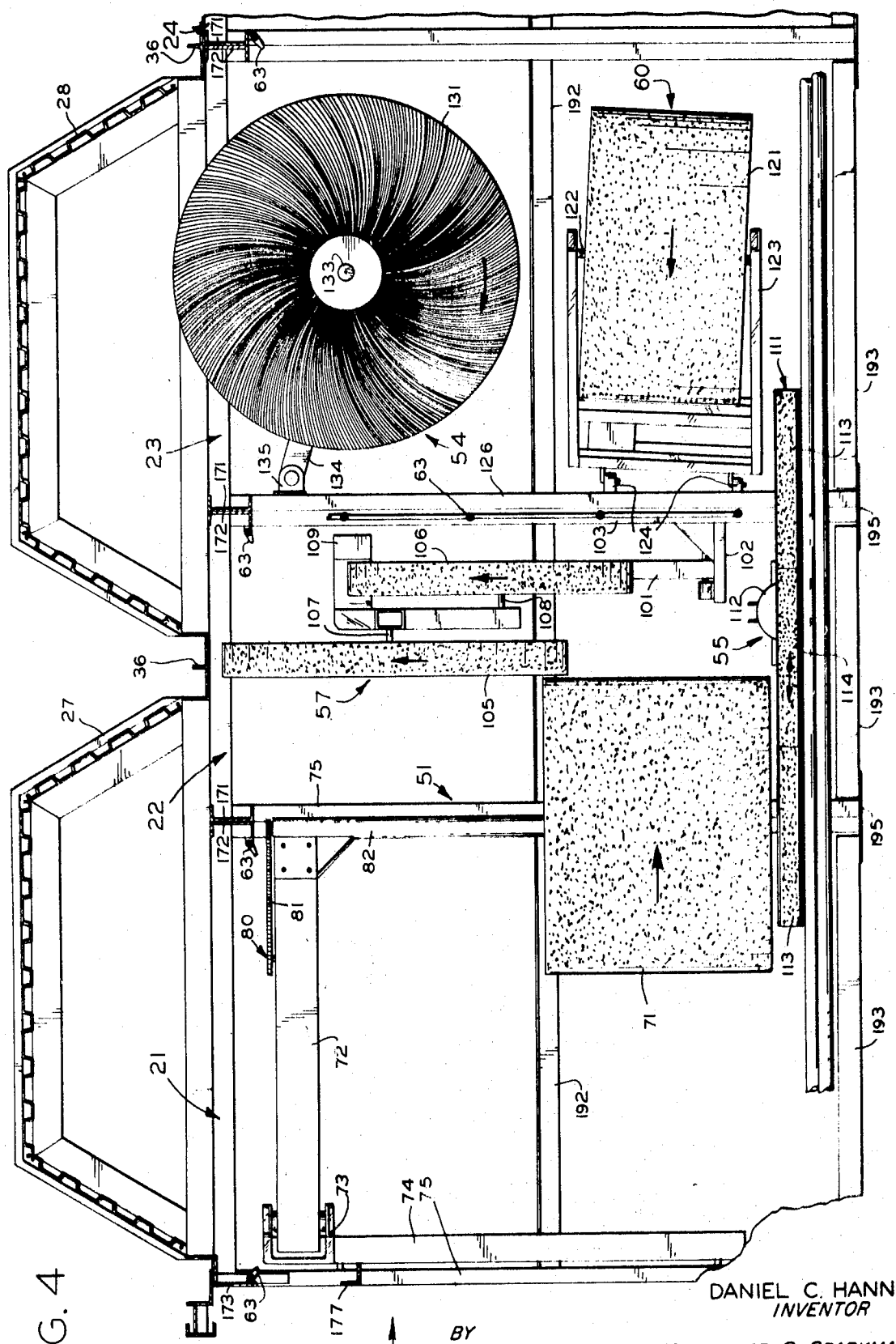
Figure 5:
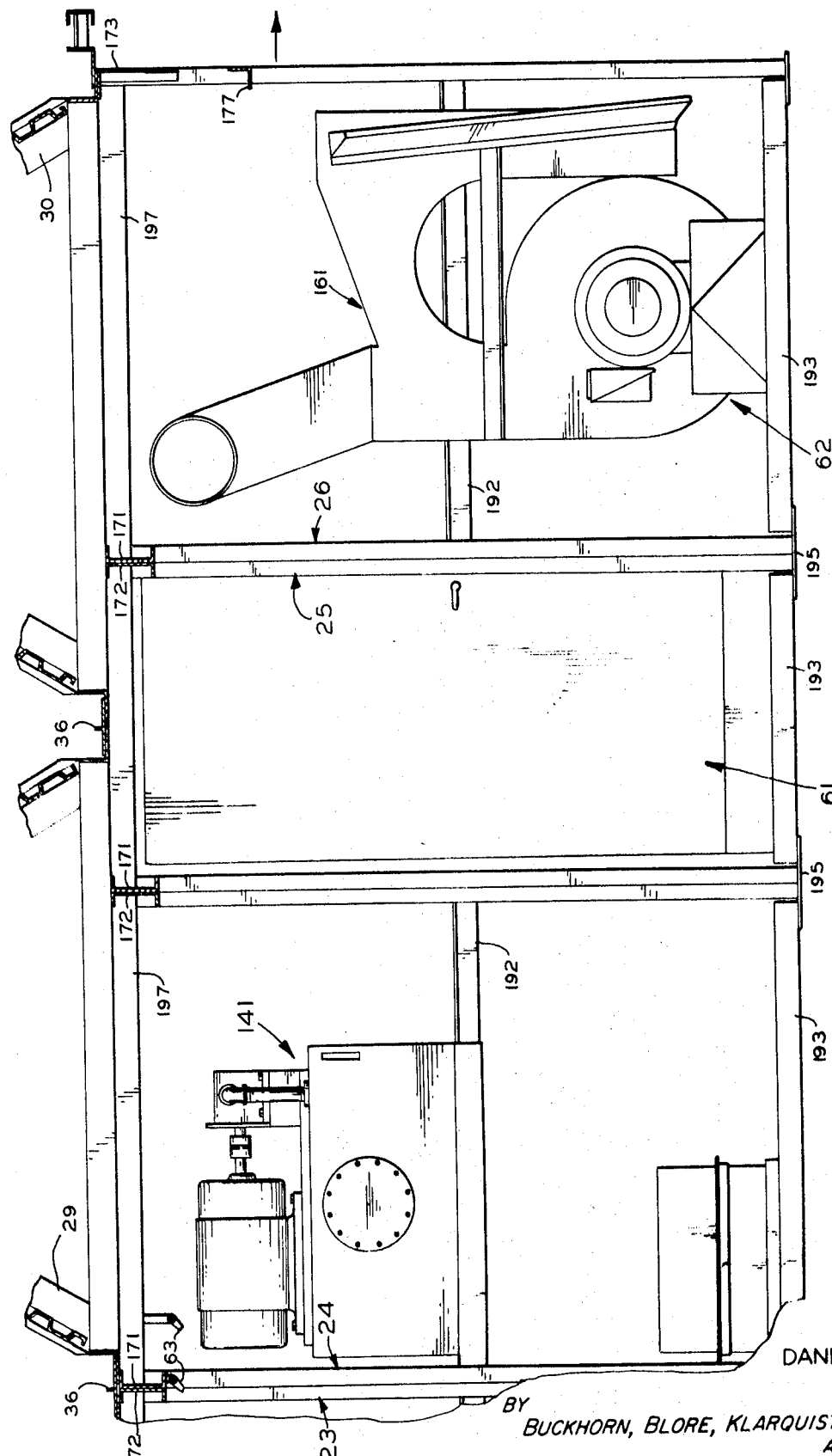

A complete understanding of the invention may be obtained from the following detailed description of a module car wash forming a specific embodiment thereof, when read in conjunction with the appended drawings, in which:

FIG. 1 is a top plan view of a module car wash forming one embodiment of the invention;

FIGS. 2, 3, 4 and 5 are enlarged vertical sectional views taken respectively along lines 2—2, 3—3, 4—4 and 5—5 of FIG. 1;

2

Figure 6:
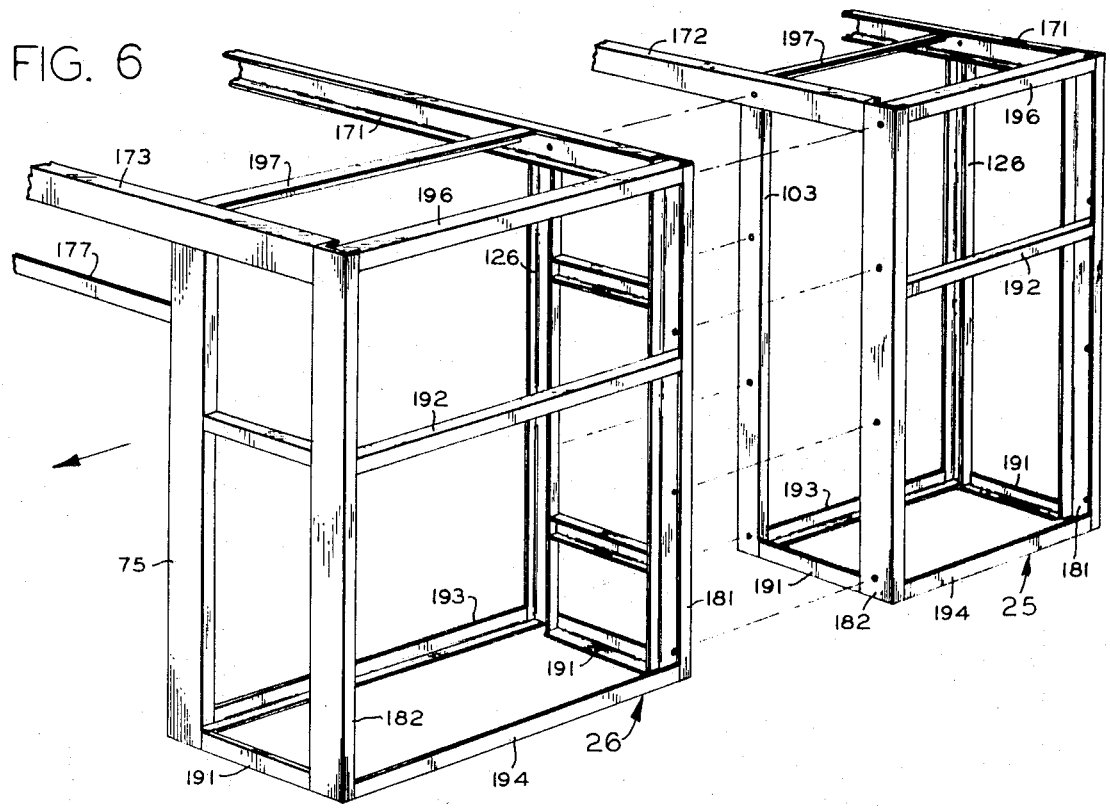
Figure 7:
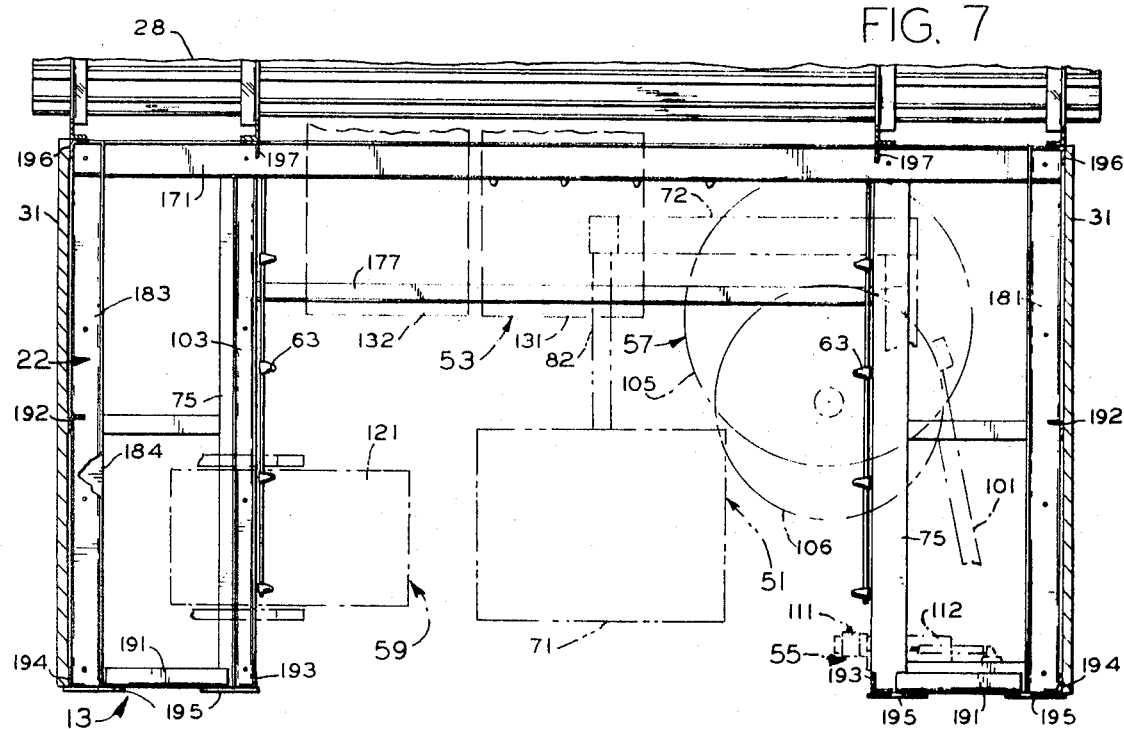

FIG. 6 is an exploded, perspective view of a portion of the car wash of FIG. 1; and FIG. 7 is an enlarged vertical sectional view taken along line 7—7 of FIG. 1.

Referring now in detail to the drawings, there is shown therein a module car wash forming one embodiment of the invention and including modules 11 to 16, which initially are separate from each other and form, when arched frames 21 to 26 thereof are bolted together, the sidewalls and framing of a building which is completed by roof sections 27 to 30 supported by the modules. The frames support siding sections 31 bolted thereto, and also support end doors 32 and 33 and side doors 34 and 35. Some of the siding sections are windowed. The roof sections have overlapped and interlocking watertight joints 36, and the siding sections also have overlapping and interlocking watertight joints 37.

The arched frames 21 to 26 serve, in addition to being the framing of the building, as the direct supports or bases of wraparound brush mechanisms 51 and 52, top brushes 53 and 54, wheel scrubbers 55 and 56, window brushes 57 and 58, side panel brushes 59 and 60, an electrical control 61, an air blowing and drying mechanism 62, oscillating spray pipes 63 and a boiler or heater system 64 for supplying hot soapy water and hot rinsing water under pressure to the spray pipes. The modules with the various above-mentioned washing mechanisms therein are separate and are shipped or transported individually and need only be bolted to a base and bolted together and the mechanisms connected to water and electrical supply sources to set up the complete car wash in operable form, which can be done very quickly.

The wraparound brush mechanisms 51 and 52 are of the type disclosed and claimed in my copending application Ser. No. 570,491, filed Aug. 5, 1966, and are mounted in staggered positions by the frames 21 and 22, respectively. The brush mechanisms 51 and 52 include rotary brushes 71 suspended by overhead arms 72 carried pivotally by overhead arms 73 carried by vertical members 74 hinged to post portions 75 of the frames 21 and 22. The arms 72 are pivotal between extreme extended positions relative to the arms 73 as shown in the drawings and positions folded back on the arms 73, and the arms 73 are pivotal from normal positions shown in the drawings to forwardly extending positions. Biasing means (not shown) normally maintain the arms 72 and 73 in their normal positions and permit movements of the arms 72 and 73 to their folded and forwardly extending positions. Each brush is rotated by a hydraulic or electric motor drive 80 (FIG. 4) through a chain transmission 81 and a shaft in a tubular journaling post 82. For shipping, the arm 72 is folded back on the arm 73 to bring the brush 71 into the frame 21 and the arms are lashed to the frame in such positions.

A car (not shown) driven or moved by a conveyor (not shown) through the car wash from left to right as viewed in FIG. 1, engages with its front end the brush 71 of the brush mechanism 51 and swings the brush 71 and the arms 72 and 73 as a unit counterclockwise until the brush 71 clears the left front corner of the car. Then the reaction of the brush, which is rotated counterclockwise, on the side of the car moves the brush back along the side of the car to fold the arms 72 on the arm 73, and the biasing means swings the arm 73 back to its normal position. The arm 72 in its folded or cocked position swings the brush 71 forwardly with and across the rear of the car when the left rear corner of the car clears the brush. Meanwhile, the right side of the car is engaged and scrubbed by the panel brush 59 and the top surfaces of the car are engaged and scrubbed by the downwardly biased, pivotally mounted top brush 53, the double, window brush 57 brushes the left windows and the wheel scrubber 55 brushes the left wheels. Hot soapy water is applied to the several brushes and to the car as this occurs. The brush 60 scrubs the lefthand panels of the car and the wraparound brush mechanism 52 brushes the right halves of the front and rear of the car and the right side of the car similarly to the brushing by the brush mechanism 51. The brush 58 brushes the right windows, the wheel scrubber 56 brushes the right wheels, the panel brush 59 brushes the right side of the car and the overhead brush 54 brushes the left half of the top surface of the car. Clear hot rinsing water is sprayed from the pipes 63 onto the car as it leaves the brushes 54 and 58 and then the drying mechanism 62 blows hot air on the car to dry it.

The window brushes 57 and 58 (FIGS. 1, 2 and 4) include generally vertical arms 101 pivotal on brackets 102 carried by posts 103 and base mount 104, respectively, of the frames 22 and 23, and each includes two rotary brushes 105 and 106 mounted on shafts 107 and 108 driven by an electric or hydraulic motor drive 109 in directions such that the portion of each brush tangentially engaging the car is moving upwardly. The brushes are long-bristled and the arms 101 are biased by gravity toward the windows of the car. The bristles of the brushes 105 and 106 are arranged in spirals on the mounting hubs thereof with the spirals being of such a pitch and such directions that the space between the turns of the spirals provides clearance for antenna on the cars. That is, the spirals act like a lead screw and, in effect, "feed" the antenna past the brushes. The brushes 105 and 106 are staggered vertically so as to be sure to brush all the areas of the windows of both large cars and small cars. The pivotal mounting of the arms 101 also aids in this since, for a small car, the upper ends of the arms 101 swing farther down because of the smaller width of the small car and this brings the brushes down to the desired height. The brushes thoroughly brush the sills and upper frame portions of the windows of the car.

The wheel scrubbers 55 and 56 (FIGS. 1, 2 and 4) are mounted on track frames between posts 75 and 103 of the frame 22, and include elongated, non-rotatable brushes 111 which are reciprocated horizontally lengthwise of the car by a motor drive 112. Tracks carrying the brushes 111 are biased along transverse guides toward the wheels to keep the brushes against the wheels and steam or nearly boiling soapy water is applied to the brushes and wheels by sprays (not shown) carried on the tracks. The brushes 111 have end sections 113 which are foldable on central sections 114 for shipping the module 12 and keeping the brush within the confines of the frame 22. The brushes 111 are below the brushes 71 for clearance purposes.

The brushes 59 and 60 (FIGS. 1, 2 and 4) each includes a brush 121 mounted on a sloping or canted shaft 122 carried by a fork 123 and rotated by a hydraulic or electric motor drive carried by the fork 123. The forks 123 are pivotally mounted on brackets 124 carried by posts 125 and 126 of the frames 21 and 23. The brackets 124 are slightly off vertical to bias the brushes 121 toward the car.

The top brushes 53 and 54 (FIGS. 1, 2 and 4) are staggered, and each includes a pair of brushes 131 and 132 mounted on a motor driven shaft 133 carried by a forked arm 134 pivotal on brackets 135. The brackets 135 are mounted on the posts 125 and 126 above the car. The arms preferably are counterweighted.

Pump units 141 and 142 (FIGS. 1, 3 and 5), repectively, pump water to the hydraulic motors of the brush mechanisms and also pump soapy and reclaim water and rinse water, and are mounted on the frames 24 and 25. The heater system 64 which, preferably, includes a heater 151 for soapy and reclaim water and a boiler 152 for rinse water, are mounted in the frame 24 on the side opposite the pump unit 141. The dryer 62 is of the double blower type including blowers 161 and 162 at each side of the frame 26. Quick connecting couplings (not shown) are provided for connecting all electrical and/or hydraulic lines carried by the frames.

As best shown in FIGS. 6 and 7, the frames 21 to 26 are arch-like and rigid. Each of the frames 22 to 25 includes at its upper end two parallel beams or cross channels 171 and 172 which abut and are bolted to the beams of the adjacent frame to form an I-beam. The frames 21 and 26 have heavy angle members 173 at the entrance and exit sides of the frames 21 and 26, respectively, and have the channels 171 and 172 also. Each of the frames 21 to 26 also includes outer posts or vertical channels 181 to 184 with the posts 181 and 183 bolted to the adjacent posts 182 and 184 of the adjacent frames to form I-beam posts. Two inner channel-like posts illustrated by the posts 75, 103 and 126 are provided at each side of each frame, except for omissions at the juncture of the upper portions of the frames 21 and 22 as viewed in FIG. 1 and at the juncture of the lower portions of the frames 22 and 23 as viewed in FIG. 1, form skeletal side compartments. The above omissions of the inner posts provide clearances for movement of the brushes 71 to the sides of the car and back along the car. The inner posts are welded to the beams 171 and 172 and base angles 191 are welded to the lower ends of the inner posts and the lower ends of the outer posts 181 to 184 and serve as shoes to bolt the frames to the floor of the car wash. Horizontal cross braces 192 are provided in the frames 21 to 26 which do not have doors therein. Lower angle members 193 and 194 are welded to the lower ends of the posts and to base shoes 195 to complete the rigid, skeletal, box-like framing at each side of the frames 21 to 26. If desired, additional modules (not shown) containing air curtains may be mounted at the ends of the modules 11 and 16.

The above-described module car wash may be shipped complete with all washing mechanisms, boiler, dryer in the separate modules and separate roof sections, and may be installed and be in fully operable condition merely by bolting the modules together and to the base, bolting the roof sections in place and making the necessary water and electrical connections between the mechanisms in the modules and connecting the boilers or heaters and electrical control to suitable sources of water and electrical sources. The frames 21 to 26 of the modules serve both as the mounts for the several mechanisms and as the framing for the building. The frames also serve as excellent shipping frames to protect the mechanisms during shipping.

It is to be understood that the above-described arrangements are simply illusrtative of the application of the principles of the invention. Numerous other arrangements may be readily devised by those skilled in the art which will embody the principles of the invention and fall within the spirit and scope thereof.

What is claimed is:
1. In a module car wash,
a plurality of arch-like modules each including a pair of box-like frames and a plurality of crossbeams secured rigidly to the upper ends of the frames to form arches therewith,
the modules being adapted to be rigidly secured together to form a side of a framing of a building,
a plurality of car brushing mechanisms,
and means mounting the car brushing mechanisms in the frames for shipment while in the frames and for movement out of the frames into the path of a car moved through the building,
some of the brushing mechanisms being carried by the beams and some of the brushing mechanisms being carried by the box-like frames.
2. The module car wash of claim 1 wherein the beams include channel-like members secured to the frames and to each other in face-to-face engagement to form I-beams.

3. The module car wash of claim 1 wherein the frames include channel-like vertical post members secured in face-to-face engagement to form I-beam posts.

4. The module car wash of claim 1 including siding sections having overlapping end portions and carried by the frames.

5. In a module car wash,
a plurality of brushing devices,
a plurality of arched frames carrying some of the brushing devices overhead and some of the brushing devices at the side,
means securing the frames rigidly together,
siding means mounted on the frames, and
roof means mounted on the frames.

6. The module car wash of claim 5 wherein the brushing devices are mounted in the several frames to form individually shippable units with the frames.

7. The module car wash of claim 5 wherein each frame includes a pair of rigid, skeletal side portions adapted to be covered by the siding means.

8. The module car wash of claim 5 wherein each frame carries a separate siding section of the siding means.

9. The module car wash of claim 5 wherein the roof means comprises a plurality of overlapping sections.

10. The module car wash of claim 5 wherein the siding means comprises a plurality of sections each mounted on one of the frames.

11. In a module car wash,
a plurality of arched frames,
means rigidly connecting the frames together in parallel positions,
siding means supported by the sides of the frames to form side enclosures of a building,
roof means supported by the frames to form the roof of the building,
a plurality of brushing devices, and
means mounting some of the brushing devices on the cross portions of the arched frames and mounting some of the brushing devices on the side portions of the arched frames.

12. In a module car wash,
a plurality of rigid, arched frames having side frame portions and top frame portions secured in side-by-side relationship to define a tunnel-like structure,
a plurality of brushing mechanisms each mounted on only one of the side frame portions,
a top brushing mechanism mounted on only one of the frames in a position adjacent to the top frame portions and movable through the top frame portions,
boiler means mounted in one of the frames, and
a top spray means mounted on only one of the top frame portions,
each of the frames and those of the mechanisms and means carried thereby being a separable, individually transportable unit and requiring only connection to utilities,
each of the frames serving to form a protective framework around the means or mechanism carried thereby for shipping purposes.

13. The module car wash of claim 12 including siding sections each mounted on one of the frames and forming substantially continuous sides when the frames are secured in side-by-side relationship.

14. The module car wash of claim 13 including roof means separable from and supported by the top frame portions.

15. The module car wash of claim 13 wherein each of the top frame portions includes a pair of parallel beam members extending from one side frame portion to the opposite side frame portion.

16. The module car wash of claim 15 wherein the parallel beam members are channel-like and the beam members of one frame abut the beam members of other frames.

17. In a module car wash,
an elongated tunnel-like structure comprising a plurality of self-contained and self-supporting prefabricated modular units, each unit comprising an inverted U-shaped arch structure including a pair of spaced vertical leg portions integrally and permanently joined to a connecting bridging portion to provide a self-supporting arch,
a plurality of washing instrumentalities, some of which are adapted to be side mounted and other adapted for overhead mounting,
at least certain of said instrumentalities each having mounting means, drive means and prime mover means,
each instrumentality and the associated mounting means and related structure being factory mounted solely and entirely on one modular unit only, whereby such modular units are designed for factory manufacture and erection thereby eliminating on-site construction.
roof covering means secured to the upper portions of said modular units and in covering relation thereto, but being independent and unrelated to said instrumentalities and elements associated with said instrumentalities, whereby primary work in constructing a car wash apparatus can be accomplished by placing the desired modules in side-by-side relationship to form a tunnel-like structure, connecting the modules together, and covering the same with a roof covering means without substantial further erection other than connection of power and energizing means to said instrumentalities.

18. In a module car wash,
an elongated tunnel-like structure comprising a plurality of self-supporting and self-contained prefabricated modular units,
each unit comprising an inverted U-shaped skeletonized framework including a pair of spaced vertical leg portions and a connecting bridge portion, said portions being integrally and permanently joined so as to dispose elements on one side of a unit in fixed predetermined relationship to elements on the other side of said unit and to provide a self-supporting arch,
a plurality of washing instrumentalities, some of which are adapted to be side mounted and others adapted for overhead mounting,
at least certain of said instrumentalities each having mounting means, drive means and prime mover means,
each instrumentality and the associated mounting means and related structure being mounted solely and entirely on one modular unit only, whereby such modular units are designed for factory manufacture and erection thereby eliminating on-site construction,
roof covering means secured to the upper portions of said modular units and in covering relation thereto, but being independent and unrelated to said instrumentalities and elements associated with said instrumentalities, whereby the primary work in constructing a car wash apparatus can be accomplished by placing the desired modules in side-by-side relationship to form a tunnel-like structure, connecting the modules together, and covering the same with a roof covering means without substantial further erection other than connection of power and energizing means to said instrumentalities,
the major number of said instrumentalities each being mounted solely on the framework of its unit and being disposed or movable to a position so as to be disposed within the confines of such framework so that said framework can function as a shipping unit.

19. In a car wash module,
a pair of crossbeam members,
a pair of rigid, skeletal, box-like frame members secured rigidly at the tops thereof to the end portions of the crossbeam members to form a rigid shipping unit and a rigid arch, and a plurality of cleaning mechanisms operationally mounted on the members and positioned fully within the rigid arch for shipping.

20. The car wash module of claim 19 wherein the crossbeam members are channel-like and are positioned with the flat sides thereof facing outwardly so as to be joined to crossbeam members of other modules.

21. The car wash module of claim 19 wherein the members include channels at the sides thereof opening inwardly and adapted to fit in face-to-face engagement with channels of other modules.

References Cited

UNITED STATES PATENTS

| | | | |
|---|---|---|---|
| 2,232,510 | 2/1941 | Buckham | 52—648 X |
| 2,445,491 | 7/1948 | Moloney | 52—648 X |
| 3,035,293 | 5/1962 | Larson | 15—21 D |
| 3,332,098 | 7/1967 | Smith | 15—21 D |

EDWARD L. ROBERTS, Primary Examiner

U.S. Cl. X.R.

15—Dig. 2; 52—173, 234